Sept. 1, 1959   J. E. LOOMIS ET AL   2,902,247
CLAMPING MEANS

Filed Dec. 23, 1955   3 Sheets-Sheet 1

INVENTORS.
JACK E. LOOMIS
DALE W. McKEE
BY
ATTYS.

Sept. 1, 1959  J. E. LOOMIS ET AL  2,902,247
CLAMPING MEANS

Filed Dec. 23, 1955  3 Sheets-Sheet 3

INVENTORS.
JACK E. LOOMIS
DALE W. MCKEE
BY
ATTYS.

2,902,247
CLAMPING MEANS

Jack E. Loomis and Dale W. McKee, Battle Creek, Mich., assignors to Clark Equipment Company, a corporation of Michigan Application December 23, 1955, Serial No. 555,025

3 Claims. (Cl. 248—361)

Our present invention relates generally to freight handling means and devices in which portable freight carirer means are associated and disassociated with freight transporting means. More particularly this invention concerns an improved clamping means for fixing a portable freight carrier means to a supporting surface of a ship or like vessel.

Generally, the present invention concerns portable freight handling and carrying devices operated according to features and concepts set forth in the copending application, Serial No. 577,118, filed on April 9, 1956, in the name of Jack E. Loomis and entitled, "Freight Handling Means and Method," which application is a continuation-in-part of application Serial No. 531,489, filed on August 30, 1955, now abandoned, and which applications are owned by the assignee of the present application. In greater detail, the present invention is directed to an improved clamping or latching means for affixing a portable freight carrier means to a supporting bed or surface such as is provided by the decking of a ship or like vessel. The referred to portable freight carrier means may, in general, be defined as comprising a supporting base structure carrying a suitable receptacle in which freight may be transported and arranged. Such portable freight carrier means is lifted and deposited or otherwise transported from dock to the deck of a ship as by a crane hoist or other material handling equipment.

In brief, the present invention comprises a suitable clamp pivotally mounted adjacent an opening in a supporting deck of a ship so that the same may be selectively moved to a projecting position above said deck for engaging a bearing surface on a freight carrier deposited thereover. Guide means are embodied in conjunction with the clamp for guiding the portable freight carrier means into a position whereat the same may be effectively engaged and held by the clamping means of our invention. A locking device is included for maintaining the clamp in its engaged condition with the freight carrier means and additional means are provided for effectively disengaging the locking device whereby the clamp may be disassociated from the freight carrier means preparatory to the latter's removal.

The main object of this invention is to provide a new and improved clamping means for anchoring a portable freight carrier means to the supporting surface of a freight transporting means as, for example, to the deck of the ship.

A further object of this invention is to provide a new and improved manually operable anchor or clamping means for effectively preventing the removal and shifting of a portable freight carrier means with respect to a supporting surface of a freight transporting means.

A still further object of this invention is to provide a new and improved clamping means embodying guide means for piloting a portable freight carrier means to a specified area of a supporting surface, and including a manually operable clamp whereby such portable freight carrier may be secured or anchored to said supporting surface, A still additional object of this invention is to provide a new and improved clamping means for anchoring a portable freight carrier means to a supporting surface, and including a manually operable clamping means which is accessible and operable from a location beneath the said supporting surface.

A still further object of this invention is to provide a new and improved clamping means for attaching a portable freight carrier means to the deck of a ship or like freight transporting means and embodying improved guide means whereby the positioning of the freight carrier means in a preselected and designated position with respect to the clamping means is assured, so that the said clamping means may positively engage and lock said carrier means to the transporting means.

The above and further objects, features and advantages of our invention will be apparent to those familiar with the art from the following detailed description and specification of a preferred embodiment as illustrated in the accompanying drawings.

Figure 1:
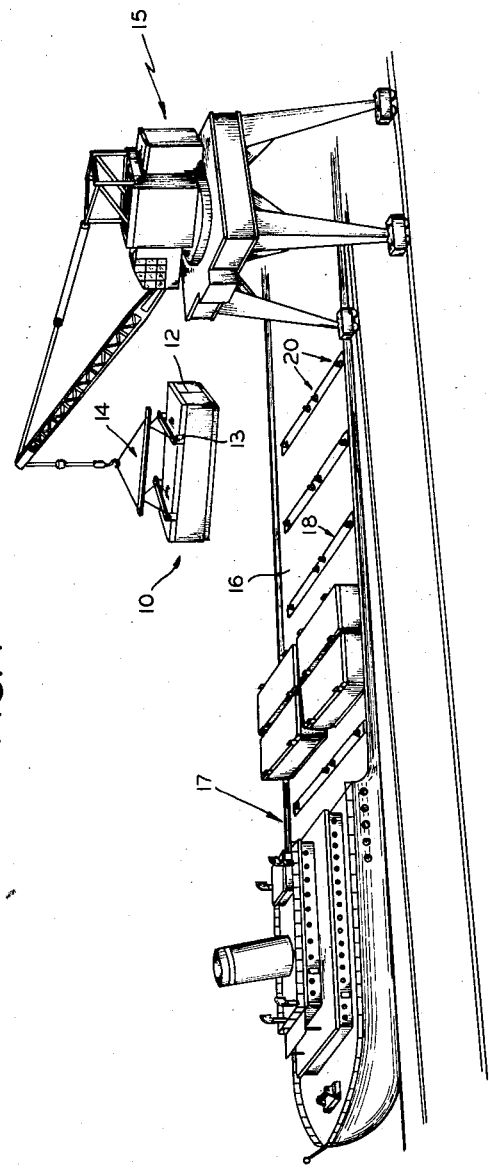
Figure 1 is a schematic represenation, in perspective, showing a typical installation in which the present invention finds utility.

As shown best in Figure 1, a portable freight carrier device, indicated generally by numeral 10, includes a base structure 11 which carries a freight receptive body portion 12. This particular type of freight carrier preferred and shown in use with our invention includes sets of upright extending ears 13 arranged to be engaged by harness means 14 capable of being engaged by a crane hoist 15 for depositing the carrier on a deck 16 of a ship or similar freight transporting means, as indicated generally by numeral 17.

It will be noted from Figure 1 that the deck 16 of the ship 17 is provided with a series of plank members 18 disposed generally transverse to the keel line of the ship 17. Each of such plank members may include, as illustrated, one, two or more sets of our improved clamping means, as indicated generally at 20; such clamping means being spaced along the length of the plank member 18 so that each pair may engage the base 11 of freight carrier means when the latter is deposited on the deck or supporting surface 16.

Figure 2:
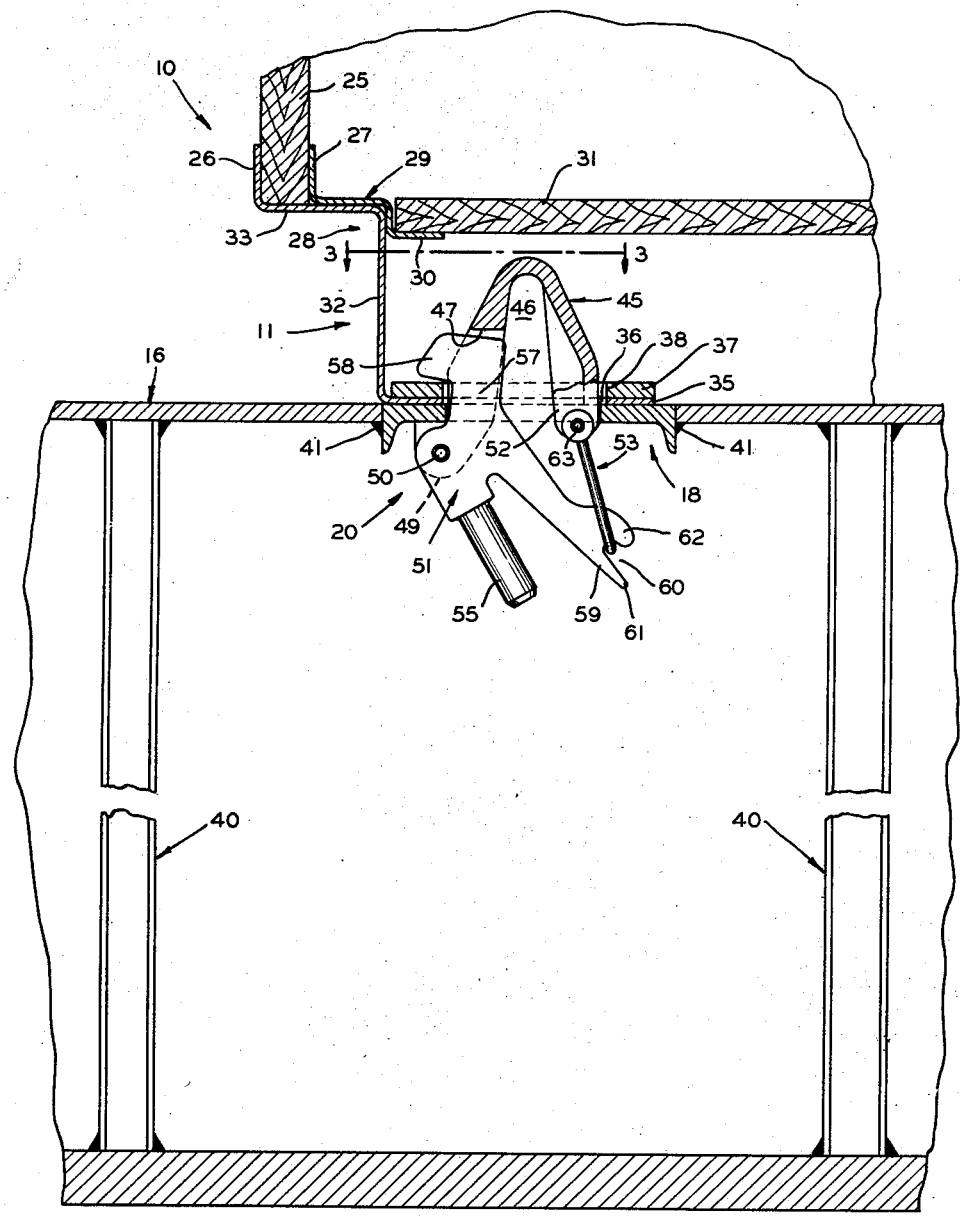
Figure 2 is an enlarged partial cross-sectional showing taken through a corner of the freight carrier means, and the underlying supporting deck of the freight transporting means, as shown in Figure 1, to demonstrate the clamping means of this invention in position to lock said carrier means to the transporting means.
Figure 3:
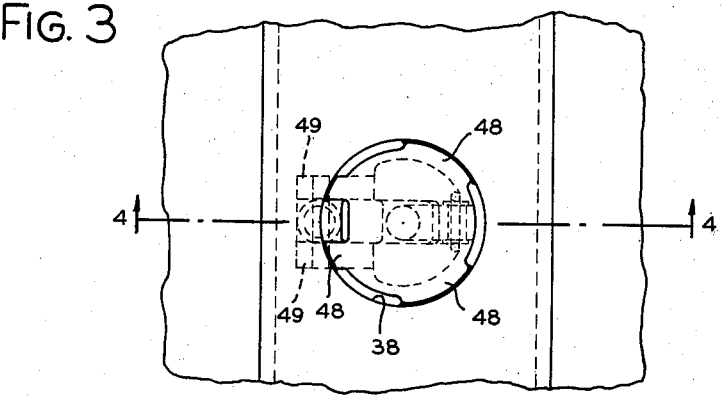
Figure 3 is an enlarged partial top plan view of the improved clamping means of this invention taken substantially from vantage line 3, 3 of Figure 2.
Figure 4:
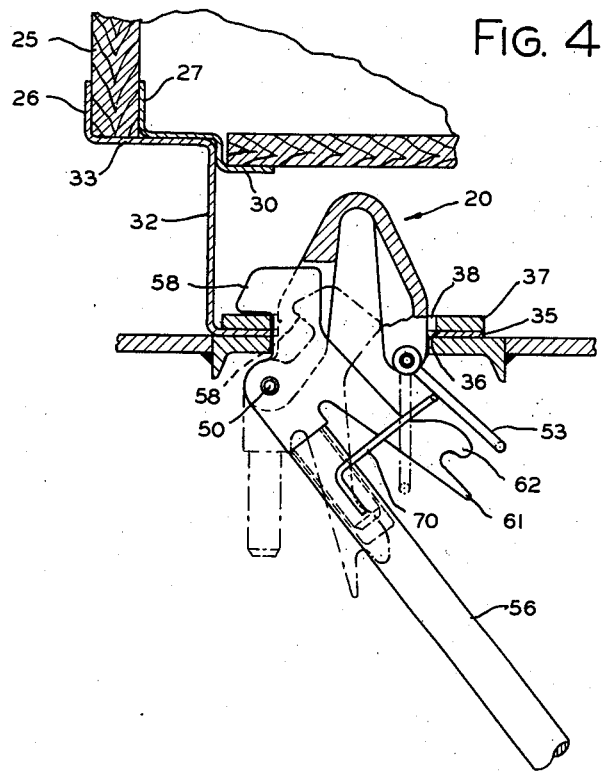
Figure 4 is an enlarged partial cross-sectional showing, similar to Figure 2, illustrating the operative and non-operative positions of our improved clamping means.

Turning now, in particular, to Figures 2, 3 and 4 of the drawings, it will be understood that the structure of the freight carrier means 10 includes side walls 25 forming the enclosure or body portion 12 thereof; the lower ends of such walls 25 being received in a reinforced metal channel formulated by spaced wall portions 26 and 27 of frame member or rail 28 and a floor supporting plate 29, respectively.

The supporting plate 29 is angularly offset to present the upward extending wall portion 27 and a horizontal platform portion 30 for supporting suitable decking or flooring 31 interiorly of the freight carrier means. Such extending platform 30 is disposed inwardly of the frame member 28 and is related substantially transversely to the plane of the main upright wall portion 32 thereon. Walls 32 and 26 of the frame member 28 are interconnected by a transversely related wall section 33 which extends between the lower end of the upright wall portion 26 and the upper end of the main wall 32 of the frame member 28.

While the cross-sectional showing in Figure 2 illustrates only a portion of the freight carrier means, it will be understood that the base structure 11 therefor comprises substantially rectangular structure including two parallel end frame members 28 and interconnecting transversely extending side frame members of a similar nature, not shown herein.

The lower end of the wall portion 32 of frame member 28 is turned inwardly to parallel the platform 30 of the plate member 29, thereby to present or define a lower platform portion 35. Platform portion 35 is distinguished particularly by an enlarged opening 36 and serves to immediately support a bearing plate 37 on its upper surface. Bearing plate 37, like platform 35, bears a central opening 38 which registers with opening 36.

It will be recognized that when the freight carrier means 10 is deposited on the support deck 16, a pair of improved anchor or clamping means 20 of our invention project upwardly through spaced opening 38 at opposite sides of its base structure to extend into the spacing between the inwardly turned platform portions 35 and the interior decking 31 of the carrier means.

Decking 16 of the ship is supported at intervals by upright stanchions 40 according to familiar ship building practice. The channel or plank members 18 on which the improved clamping means 20 of our invention are supported, are deposited directly in the decking 16 of the vessel and secured thereto as by welds 41 or other attachment means shown in Figure 2.

It will be understood that, in general, several improved clamping means 20 of this invention are associated with the decking 16 of the vessel in a manner to invade the base structures of the freight carrier means deposited on the deck. Such means 20 serve to clamp the freight carrier means to the supporting surface of the vessel as provided by the decking 16 thereon.

Turning now to the particulars of our clamping means, it will be seen, as shown best in Figures 2 and 4 of the drawings, that such includes a guide means 45 formed as a substantially dome or pyramid-shaped casting having a hollow interior defining a chamber 46 invaded by an entry way 47 extending from the exterior of such casting. The casting is further defined on its exterior surface by three bearing lands 48, 48, as best shown in Figure 3, which effect a tripod support or bearing means for engaging the periphery of the opening 38 in the bearing plate member 37 as the carrier is lowered into position. The casting 45 further includes a pair of downwardly extending ear portions 49, 49 which are spaced apart and extend beneath the chamber 46 substantially along opposite sides of the entry way 47 to provide bearing supports for a pivotal axle 50 on which a bell crank clamp member 51 is supported for pivotal movement. It will be noted further that the casting 45 sits within an opening formed in the channel member 18 and that the ear portions 49 thereof project laterally outward of the periphery of such opening and beneath the lower face of the channel member 18. The casting 45 is preferably welded or otherwise rigidly fixed to the channel member 18 so that it extends upwardly from the decking 16. An additional ear portion 52 is formed on casting 45 substantially opposite the entry way 47. Such ear projects beneath the channel member 18 to support a latching device 53, as will be amplified presently.

As stated hereinabove, the improved clamp member 51 of our invention is pivotally supported on axle 50 carried by the casting 45. Such clamp member 51 includes a depending cylindrical arm 55 which is insertable in one end of an operating handle 56, as seen best in Figure 4 of the drawings.

A first arm portion 57 of the clamp member 51 extends upwardly from the pivotal axle 50 so as to invade the hollow dome like chamber 46 of the casting 45. Such arm portion 57 includes a clamping lip 58 projecting substantially transversely to the longitudinal axis of arm portion 57. Lip portion 58 is designed to overreach bearing plate 37 by extending through the entry way 47 in the side of the casting when the clamp member 51 is disposed in its operative or clamping condition, as shown in Figure 2 of the drawings.

A second arm portion 59 is formed on the clamping member 51 to extend outwardly and rearwardly of the first arm portion 57; such substantially paralleling the longitudinal axis of the cylindrical arm 55. The second arm portion 59 includes a detent recess 60 at its outer end defined by two finger extensions 61 and 62. Finger 62 is shorter than finger 61 and bears a reentrant contour for hooking engagement with the locking device 53, which comprises a substantially U-shaped bail or keeper. The locking device 53 is pivoted on the ear portion 52 of the casting 45 for movement about an axis 63 paralleling the pivotal axis defined by axle 50 associated with the clamp member 51. It will be understood that with the clamp member 51 in its raised or operating condition for engaging the bearing plate or pad 37 carried by the freight carrier base structure 11, the locking device 53 may be swung over finger 62 to engage the detent recess 60 to securely hold the clamp member 51 in its raised condition, as shown in Figure 2 of the drawings.

By removing the locking device 53 from the detent recess 60 of the clamp member 51, the latter member may be swung clockwise, as viewed in Figures 2 and 4, so that the extending clamping lip portion 58 thereof may be moved from a position extending outwardly of the exterior of the guide casting 45 to a position within the hollowed-out dome chamber 46 thereof. This retracted position is indicated by the dotted lines showing of the clamp in Figure 4. To accomplish such disengaging movement of the clamp member 51, the operating handle 56 is provided with a projecting finger 70 which may be appropriately swung (by rotating the handle 56 relative to the cylindrical arm 55 of the clamp) to engage the bail or locking device 53 and hold such in a raised condition where it does not interfere with the movement of arm portion 59 in a downward or clockwise sense about the pivot axis 50.

From the foregoing description of the elements employed in the improved clamping mechanism of this invention, it is believed that those familiar with the art will readily understand and recognize the concepts and operational features of our invention. Briefly, however, it may be stated that the clamping means serves to provide a means which is accessible to an operator in the spacing between the decks or below the supporting deck 16 of the vessel, whereby the freight carrier means which is piloted into proper position by the guide means 20 may be detachably secured to the decking of the vessel. The provision of the locking device 53 in association with the clamp means permits the retention of the clamp means and particularly the lip portion 58 thereon in a position for securing and holding the freight carrier means to the supporting deck 16. It will also be appreciated that our clamp means is so located with respect to the structure of the ship that its operation in an overhead position is substantially mandatory so that the provision of the operating bar 56 is paramount. The projecting arm 70 of the operating bar affords a convenient means for moving and maintaining the locking device 53 in a non-operative position with respect to the detent recess 60 of the clamp means. This function is performed by first rocking the clamp 51 counterclockwise, as seen in Figure 4, to release the tension on the bail or locking device 53 and thereafter rotating the operating handle 56 relative to the projecting cylindrical arm 55 of the clamp to thereby engage the latching device 53 so that it may be moved and held away from the detent 60, as desired. Additionally, the improved clamping means of our invention insures a positive interlock between the portable freight carrier means and the supporting surface of the transporting means and its simplicity promotes a minimum of operational difficulty.

While we have herein shown and described the concepts of our invention as related to a preferred embodiment thereof illustrated in the accompanying drawings, it is nevertheless apparent that numerous changes, modifications and substitutions of equivalents may be made therein without necessarily departing from the spirit and scope of our invention. As a consequence, it is not our intention to be limited to the particular form of our invention herein shown and described except as may appear in the following appended claims.

We claim:

1. For use in attaching a portable freight carrier means to a supporting surface of a freight transporting means of the class described, the combination comprising, a bearing plate attached to the carrier means and having an opening therethrough, a dome-shaped guide means attached to the transporting means and extending upwardly through the supporting surface thereon, such guide means entering the opening in said bearing plate to locate the carrier means on the supporting surface of the transporting means, a dome-like chamber within said guide means, a lateral opening communicating between said chamber and the exterior of said guide means, a manually operable bell crank clamp member pivotally mounted on said guide means beneath the supporting surface of the transporting means, a first arm portion on said clamp member adapted to support a manual operating handle, a second arm portion on said clamp member including a lip portion extending into said dome-like chamber, arcuate movement of said first arm portion in one direction serving to move said second arm portion in a like arcuate direction to an operating position exteriorly of said guide means whereat said lip portion thereon engages said bearing plate, a third arm portion on said clamp having a detent recess adjacent its outer end, and a bail-like lock means pivotally supported on said guide means for engaging said detent recess to hold said clamp means in said operating position against the force of gravity and lock the carrier means to the transporting means.

2. The combination as set forth in claim 1, wherein said operating handle is rotatably mounted on said first arm portion and includes an extending arm operable with rotation of said handle to engage said lock means and hold the same out of said detent recess.

3. A clamping device for securing a plate member to a support structure presenting a surface for supporting the plate member, the latter having an opening formed therethrough, comprising, a hollow dome-like guide member extending upwardly from the supporting surface and presenting an exterior guide surface adapted to enter the opening in the plate member for piloting the latter onto the supporting surface, said guide member having a lateral opening formed through one side thereof, a clamp member pivotally mounted in the hollow of said guide member opposite said lateral opening and having a portion depending beneath said guide member and support surface, a detent recess formed in said depending portion of the clamp member, a latch member pivotally mounted adjacent said clamp member and adapted to be moved into a position of engagement with said recess to prevent pivotal movement of said clamp member, an operating handle detachably engageable with said clamp from the underside of the support structure, said handle serving to pivotally operate said clamp member to move the same to a clamping position whereat a portion thereof extends outwardly through said lateral opening to interferingly engage the plate member and hold the same on the supporting surface, said latch member when engaged with said recess serving to mechanically lock said clamp member in its said clamping position.

References Cited in the file of this patent

UNITED STATES PATENTS

| 378,284 | Briscoe | Feb. 21, 1888 |
| 917,379 | Tayntor | Apr. 6, 1909 |
| 2,031,302 | Clark | Feb. 18, 1936 |
| 2,034,971 | Brockway | Mar. 24, 1936 |
| 2,117,067 | Ludington | May 10, 1938 |
| 2,427,603 | Higgins | Sept. 16, 1947 |

FOREIGN PATENTS

| 186,937 | Great Britain | Apr. 12, 1923 |